July 7, 1931.  J. R. WHEARY ET AL  1,812,912
LOCOMOTIVE SMOKE BOX CONSTRUCTION
Filed Feb. 7, 1930  3 Sheets-Sheet 1
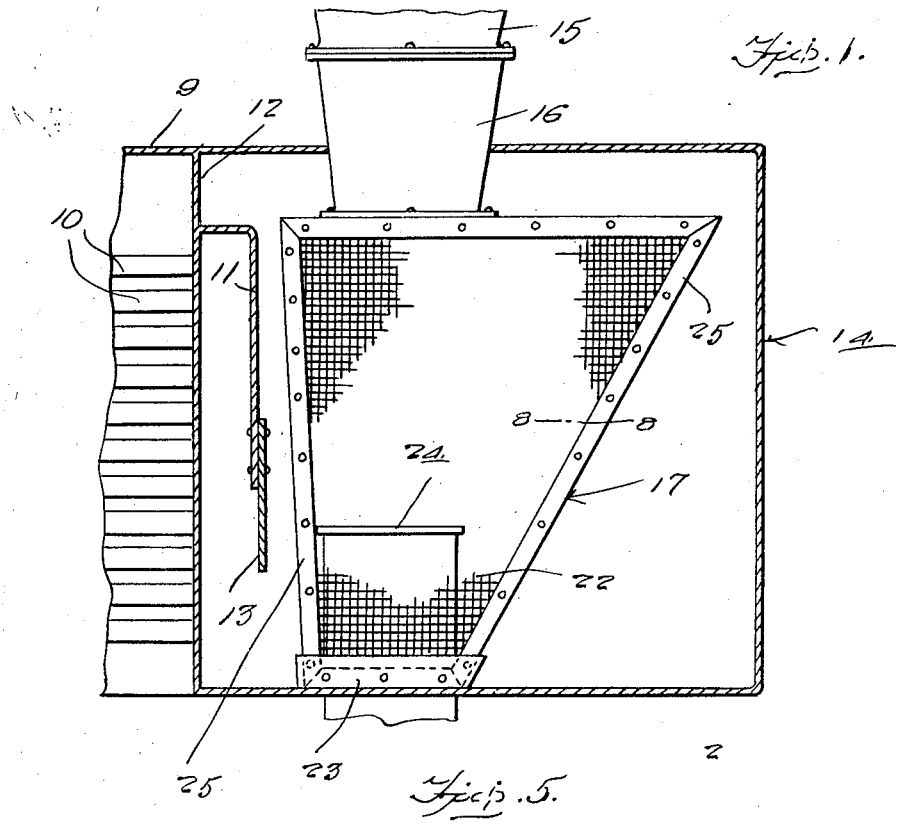
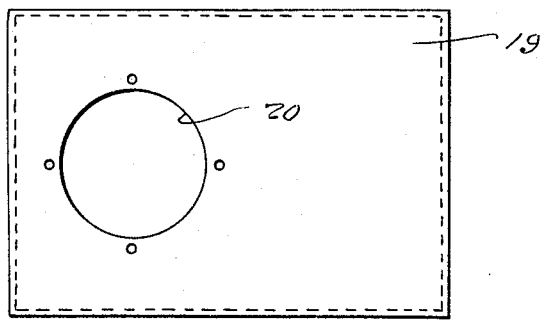
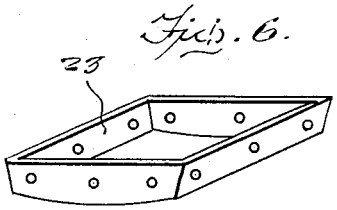
Inventors
J. R. Wheary
G. J. Lucas
By Clarence A. O'Brien
Attorney

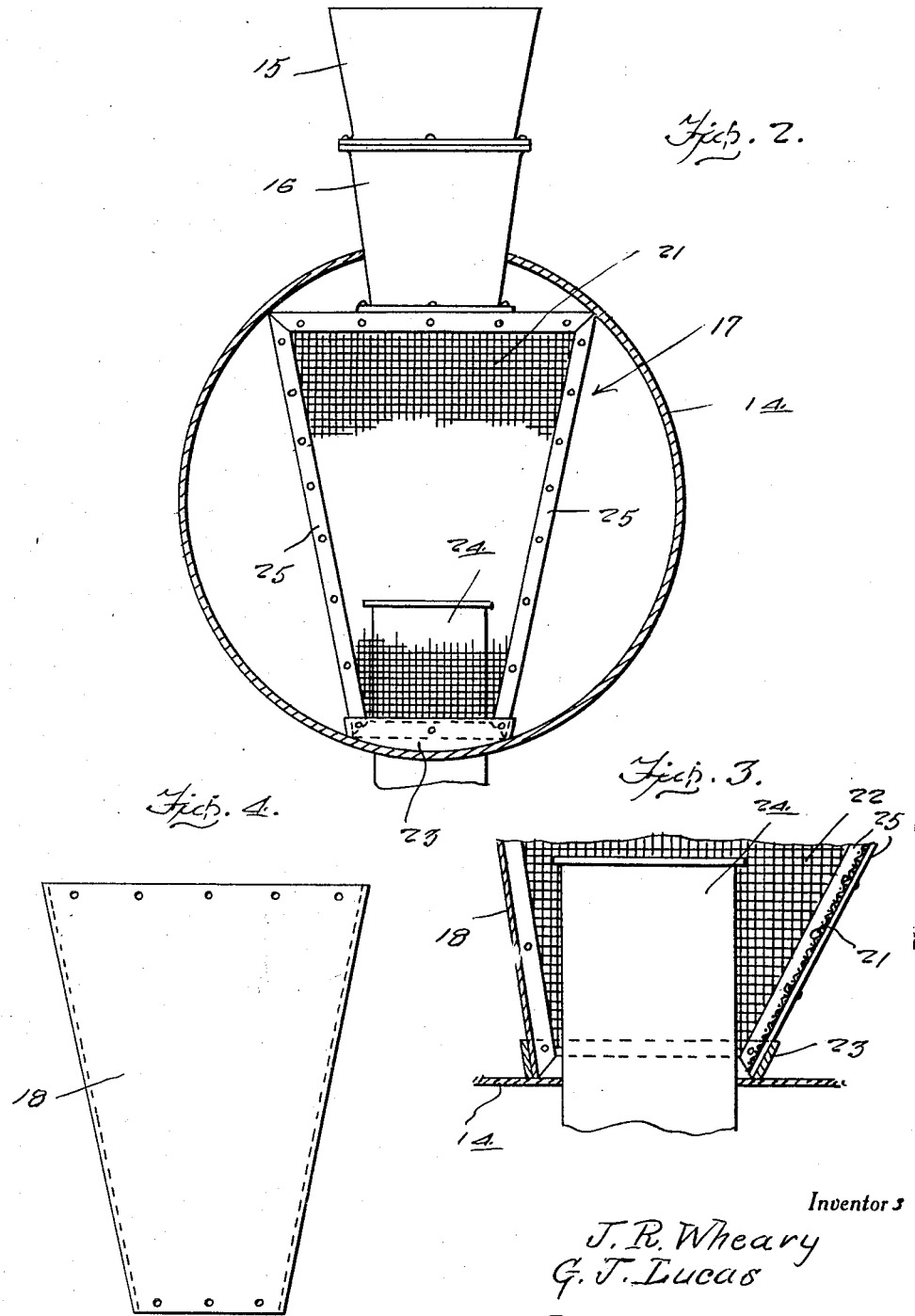

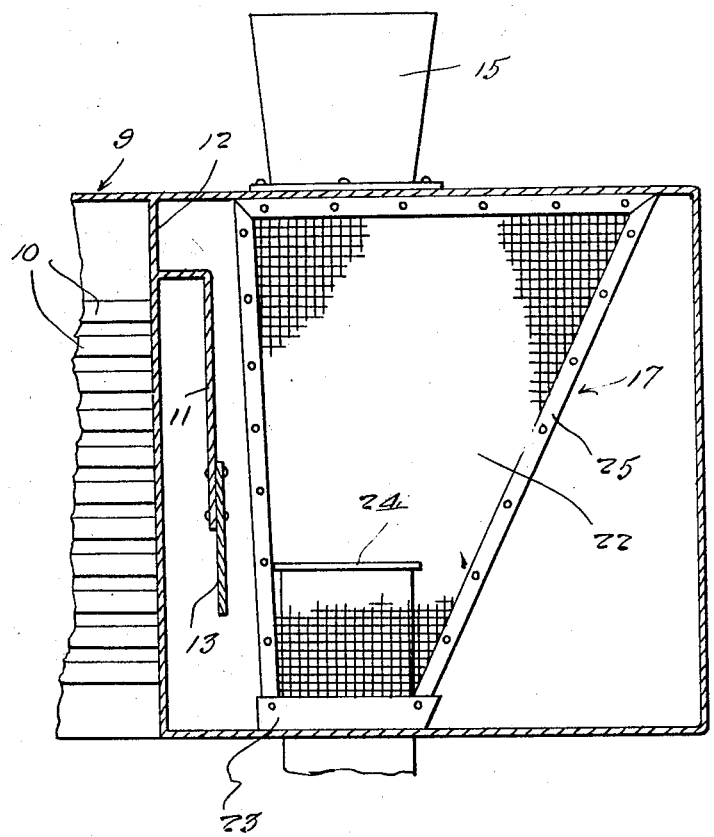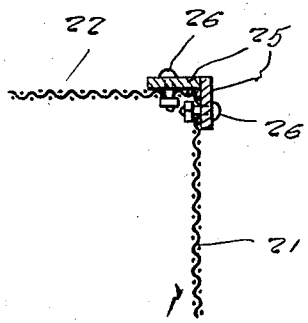

Patented July 7, 1931

1,812,912

UNITED STATES PATENT OFFICE

JOSEPH R. WHEARY AND GEORGE J. LUCAS, OF CREWE, VIRGINIA

LOCOMOTIVE SMOKE BOX CONSTRUCTION

Application filed February 7, 1930. Serial No. 426,740.

This invention relates to an improved locomotive smoke box structure, characterized by advantageous refinements and features not found in prior used and patented constructions with which we are familiar.

A characteristic distinction embodied in the new arrangement is the provision of a practical and feasible spark arrester which is especially made and arranged to minimize the escape of dangerous sparks into the atmosphere, and to thereby relieve fire hazards within the vicinity of railroad tracks.

A further feature of the invention is predicated upon the incorporation in the structure of an efficient foraminous cage so made as to facilitate the production of an efficient draft and at the same time to prevent the passage hereinto of dangerous particles of combustion and spark.

Other features and advantages will become more readily apparent from the following description and drawings.

In the drawings:

Figure 1 is a view in section and elevation showing the preferred embodiment of the invention.

Figure 2 is a section on the line 2—2 of Figure 1.

Figure 3 is a section and elevational view showing the anchorage for the lower end portion of the cage.

Figure 4 is a detail view of the front plate of the cage.

Figure 5 is a top plan view of the cage.

Figure 6 is a perspective view of the anchoring frame.

Figure 7 is a view similar to Figure 1 showing a slightly modified embodiment of the invention.

Figure 8 is an enlarged detail section on the line 8—8 of Figure 1.

In Figure 1, the reference character 9 designates the discharge end portion of the conventional boiler and 10 represents the boiler tubes. In accordance with the present invention there is a depending baffle plate 11 carried by the head plate 12 and this baffle plate has an extension 15 at its bottom which assumes a proper elevation with respect to the lowermost tubes.

The numeral 14 designates generally the smoke-box, 15 represents the smokestack, and 16 a supplemental part of the stack which is referred to variously as a petticoat or skirt. This extends into the interior of the firebox where it is bolted or otherwise attached to the cage 17. Incidentally, the cage is of general polygonal cross section and is composed of four distinguishable flat walls. For instance, the front wall 17 (see Figure 4) is in the nature of a solid plate of the configuration shown. The top 19 is also in the nature of a solid plate and of general rectangular configuration and formed with a hole 20 with which the skirt 16 communicates.

In addition, there is a rear screen wall 21 and spaced parallel side walls 22 all of which are inclined inwardly and downwardly and fastened to an anchoring frame 23 of the type shown in Figure 6. This frame is rigidly fastened to the bottom of the smoke box as shown in Figure 1.

The frame surrounds the inwardly protruding end of the exhaust nozzle 24. The nozzle as seen, projects upwardly into the interior of the cage 17. The terminal end thereof is above the lower end of the baffle extension 13. Incidentally, the reticular walls 21 and 22 are of appropriate mesh screen and these are made rigid by marginal fastening strips or bars 25 secured together in angular relationship as seen in Figure 8. The screens are bolted to the bars through the medium of bolts 26.

Directing attention to Figure 7, it will be seen that the modified form of the invention is quite similar to that already described with the exception that the skirt 16 is omitted and the cage 17 is extended entirely to the top of the smoke-box and suitably fastened thereto.

The primary object of this invention is to prevent the engine from throwing fire by completely enshrouding the exhaust stand from any opening other than the meshes in the cage netting, whereby the exhaust from the locomotive by suction could force sparks to the atmosphere in a burning condition. This invention eliminates the usual table sheets in the smoke box and re-arranges the position of the diaphragm from the front of the exhaust stand to the rear of it by attaching it to the baffle plates.

By eliminating the table sheets from the smoke-box, a better vacuum is created, which results in a better steaming boiler, saves the consumption of fuel and makes an absolute prevention for the engine to throw fire.

We submit that locomotives equipped with this netting lessens the fire hazards that railroads are confronted with by setting out of fires along the right-of-way. We also claim it lessens the maintenance cost by eliminating the table sheets and brings into full view of the netting inspectors all of the appurtenances of this netting which enables them to make a close and thorough inspection without drawing the fire, which is very expensive. We also claim that the cost of sparking the front end is eliminated as there is no accumulation of sparks due to the perfect sparking conditions of our netting.

In the application of the screen netting, it is very important to get it applied in such a way that the sparks will not hang in the meshes. Sparks striking against the netting must not strike the netting with a radius, but must strike squarely against the square surfaces. This causes the sparks to gravitate and prevent clogging of the pores of the screen.

It will be observed that the cage is made in four distinguishable sections, and each side is fastened to the bottom of the smoke-box and it does not interfere with the exhaust nozzle in any way whatever. In the primary form of the invention, the walls of the cage extend in a substantially vertical position to the bottom of the petticoat pipe, where a large plate is bolted to the bottom of the petticoat pipe, said plate constituting the top of the cage.

There are no obstructions whatever to retard the passing of the exhaust from the pipe to the smokestack and this method with any kind of netting desired makes an absolutely fireproof structure for the front end and prevents the passage of sparks from the smokestack into the atmosphere to the extent of rendering the complete structure highly satisfactory and efficient.

It is to be remembered that most railroads require inspection of netting to see that it is maintained free from defects to prevent the engines from throwing fire. There must be some arrangement made for the application of the netting to the front end whereby this inspection can be made. In the present arrangement, there is no obstruction whatever to the inspection of the netting. It can be easily inspected on the sides, front, back and top and it can be inspected without drawing the fire from the firebox or cooling the engine down.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

We claim:

In a spark arrester for locomotives, in combination, a boiler including an end head, flue tubes connected with said head and arranged in said boiler, a smoke box extending outwardly from and surrounding said head, an exhaust nozzle projecting upwardly into said smoke box, a smokestack extending upwardly and outwardly from the smoke box and in vertical alinement with said nozzle, a multiple wall cage arranged in said smokebox in spaced relation to the end head and having its lower end portion embracing the projecting end of the nozzle and its upper end portion connected with the smokestack, said cage including screen walls of substantially flat form converging inwardly and downwardly around the discharge end of said nozzle, and a baffle plate including a horizontal portion attached to said head and a depending vertical portion spaced from the head and the discharge ends of said tubes and spaced from the rear wall of the cage.

In testimony whereof we affix our signatures.

JOSEPH R. WHEARY.
GEORGE J. LUCAS.